United States Patent [19]

Tsukamura et al.

[11] Patent Number: 5,450,381
[45] Date of Patent: Sep. 12, 1995

[54] MAGNETO-OPTICAL RECORDING UTILIZING SIGNAL PHASE ADJUSTMENT

[75] Inventors: Yoshihiro Tsukamura; Seiji Kobayashi; Hiroshige Okamura, all of Kanagawa, Japan

[73] Assignee: Sony Corporation, Tokyo, Japan

[21] Appl. No.: 86,138

[22] Filed: Jul. 1, 1993

[30] Foreign Application Priority Data

Jul. 7, 1992 [JP] Japan .................................. 4-203015

[51] Int. Cl.$^6$ .............................................. G11B 11/12
[52] U.S. Cl. ...................................... 369/13; 369/124; 369/47; 369/54
[58] Field of Search ............ 369/13, 32, 44.26, 44.34, 369/47, 58, 48, 275.3, 275.2, 50, 54, 124, 44.11, 59, 275.1, 275.4; 360/51, 59, 114

[56] References Cited

U.S. PATENT DOCUMENTS

5,060,208 10/1991 Nagai et al. ........................... 369/13

*Primary Examiner*—Ali Neyzari
*Attorney, Agent, or Firm*—Limbach & Limbach

[57] ABSTRACT

Magneto-optically recorded data can be recorded at high density, such that the data can be overwritten by a simple arrangement and with a small energy. Also, data of high recording density can be accurately recorded and reproduced by a simple arrangement. An alternating field having the same frequency as that of a recording fundamental clock generated by a PLL circuit (8) is generated by a coil (5) that is part of a tank circuit (7) and then applied to a magneto-optical disc (1). A phase of the recording fundamental clock is modulated by a phase modulating circuit (12) in association with recording data and a pulse synchronized with leading edge and trailing edge of such clock is generated by a pulse generating circuit (13). An optical pickup device (4) irradiates the magneto-optical disc (1) with a laser light in synchronism with the pulse. Therefore, a high density recording method in which the edge position of pit is shifted stepwise in association with data to be recorded can be applied to a magneto-optical recording medium.

27 Claims, 9 Drawing Sheets

FIG. 2A (PRIOR ART) RF Signal

FIG. 2B (PRIOR ART) Binary RF Signal

FIG. 2C (PRIOR ART) Reference Clock

FIG. 2D (PRIOR ART) Sawtooth Wave Signal

MAGNETO-OPTICAL RECORDING UTILIZING SIGNAL PHASE ADJUSTMENT

BACKGROUND OF THE INVENTION

1. Field of the Invention

The present invention relates to a magneto-optical disc recording method for use in recording audio and video data on a magneto-optical disc (MO disc). The present invention also relates to a magneto-optical disc recording and reproducing apparatus therefor.

2. Description of the Prior Art

In conventional optical discs that are utilized in a CAV (constant angular velocity) mode, each track has at a predetermined position periodically provided with a servo byte interval in which there are formed a clock pit for generating a reference clock and a wobbled pit for effecting tracking. A reference clock (channel clock) is generated in association with the clock pit and information is digitally recorded by means of a pit whose length corresponds to integral times of the period of the reference clock. Although a system such as a CD (compact disc) utilized in a CLV (constant linear velocity) mode has no clock pit, length and bit interval of a recorded pit are selected to become as long as an integral number of times (lengths of nine kinds in a range of from 0.9 $\mu$m to 3.3 $\mu$m in the case of CD) of the period (0.3 $\mu$m) of the reference clock (channel clock), whereby the clock is reproduced and recorded information is cut in bit units.

In video discs that are also optical discs, a video signal is recorded and/or reproduced so that the difference in length of the pits are far smaller than that of the CD. This phenomenon will be described below in association with an example of a signal that is recorded on the video disc at a radial position of 55 mm according to the CAV mode. In video discs, a brightest portion of a video signal is recorded as a signal of 9.3 MHz and a darkest portion thereof is recorded as a signal of 7.6 MHz. These frequencies of 9.3 MHz and 7.6 MHz correspond to lengths of 1.075 $\mu$m and 1.316 $\mu$m on the video disc having a radius of 55 mm, respectively. It is a well-known fact that, if the disc thus recorded is reproduced, then a high quality picture can be reproduced. Assuming that the change of brightness can be expressed with 128 tones in the above reproduced picture, then it is to be appreciated that this means that the period of pits recorded on the video disc corresponding to the 128 will require sensitivity to very small variations in pit length. That is, the changes of pit length and pit interval of $(1.316\ \mu\text{m} - 1.075\ \mu\text{m}) \div 128 = 0.002\ \mu\text{m}$ are reflected in the video signal.

The reason that the minimum unit of the change of the pit length is inevitably selected to be as large as 0.3 $\mu$m in the (CDs although very small changes in pit length can be recorded) is based on the assumption that the signal will not be recorded and/or reproduced by an optimum recording and/or reproducing method.

The assignee of the present application has previously proposed a method in which the position of a front end (forward) or rear end (backward) edge of the information pit is stepwise shifted from a predetermined reference position in response to information to be recorded (see Japanese patent application No. 3-167585). According to this previously-proposed recording and reproducing method, the changes of pit length and pit edge position can be detected with very high accuracy so that it becomes possible to record information utilizing very small changes in pit length unlike the prior art. Consequently, higher density recording can be realized.

Figure 1A:
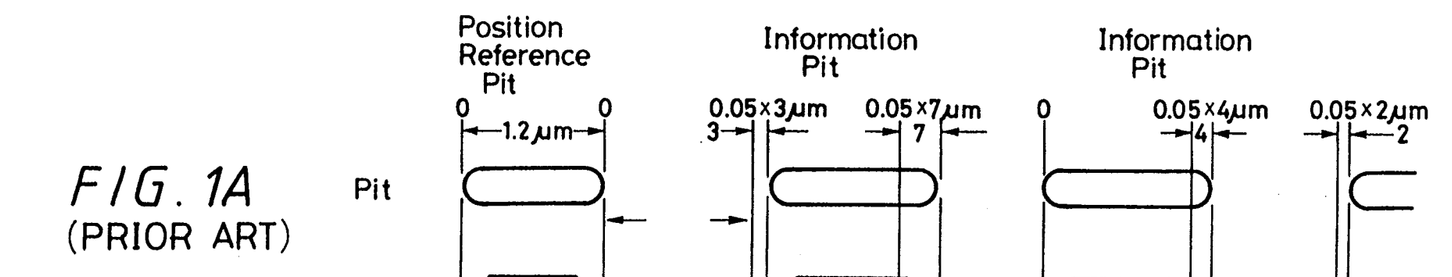
FIGS. 1A to 1C are diagrams used to explain a conventional high density recording method in which information is recorded on an optical disc by shifting an edge position stepwise.
Figure 1B:
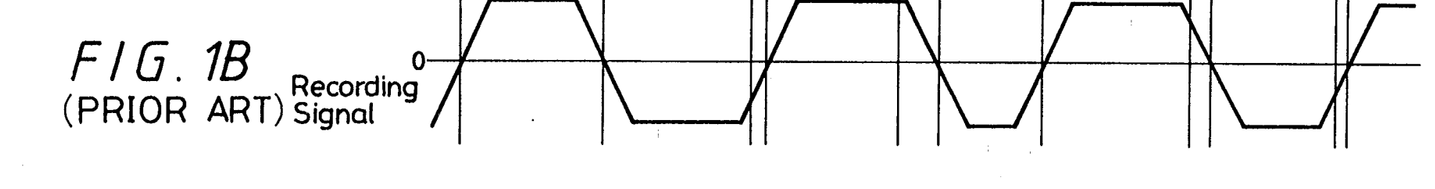
Figure 1C:
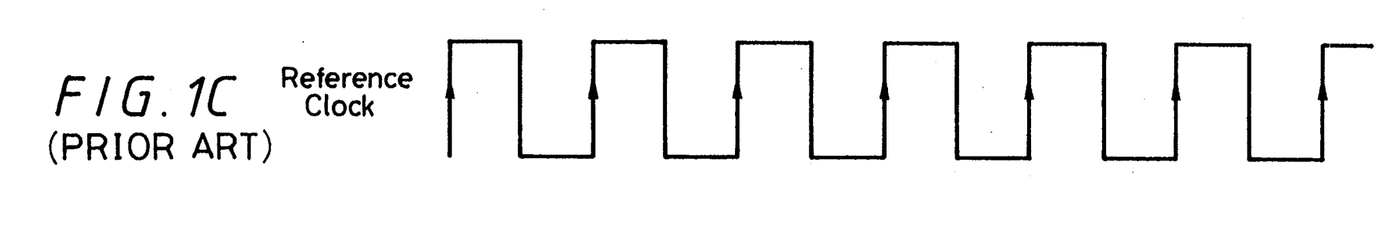
Figure 2A:
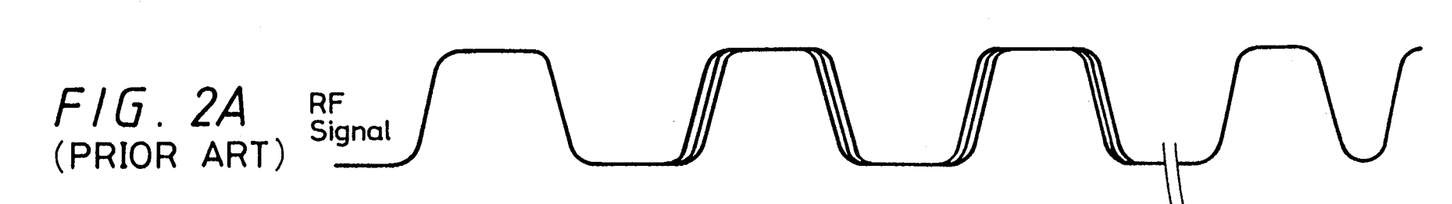
FIGS. 2A through 2D are diagrams used to explain a method of reproducing data that is recorded by the high density recording method shown in FIGS. 1A to 1C in which information is recorded on the optical disc by shifting an edge position stepwise.
Figure 2B:
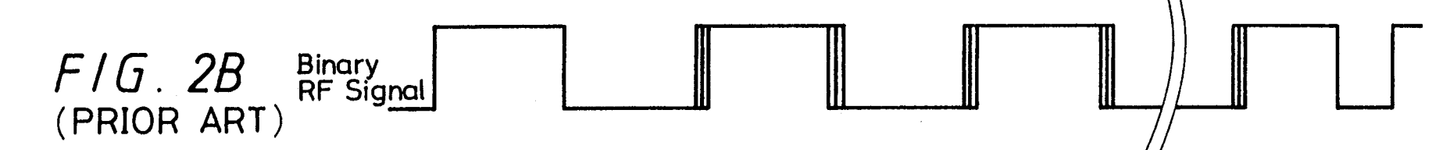
Figures 2C, 2D:
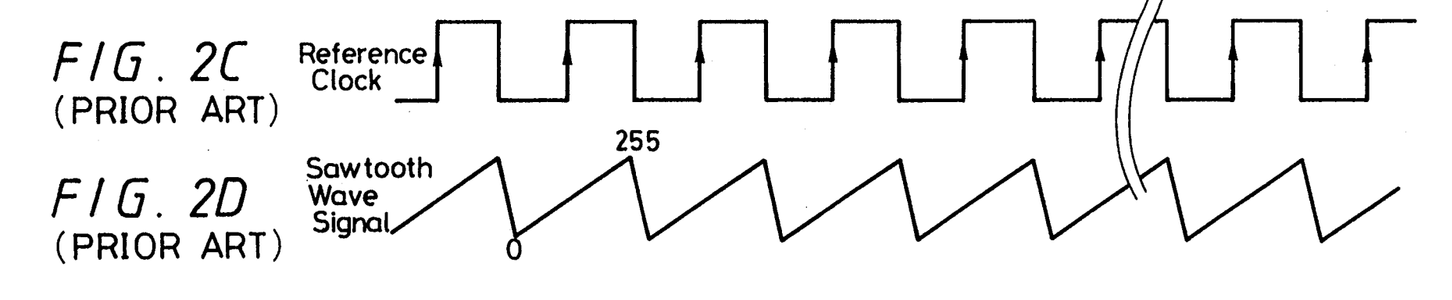

FIGS. 1A to 1C of the accompanying drawings illustrate a principle of the aforesaid method, proposed by the assignee of the present application, in which the edge position is stepwise shifted and information is recorded. Initially, a PWM (pulse width modulation) signal (see FIG. 1B) is generated in response to recording data and a pit (see FIG. 1A) corresponding to the length provided when the recording signal is at its zero-cross point is formed. With this arrangement, the edge position of the pit is changed stepwise from a position shown by a reference clock (see FIG. 1C). In association with the amount of such change, data of eight stages (3 bits) from 0 to 7 can be recorded per edge.

FIGS. 2A through 2D are diagrams used to explain the principle by which the signal thus recorded is reproduced. Initially, an RF signal (see FIG. 2A) reproduced from an information recording medium is amplified to obtain a binary RF signal (see FIG. 2B). A clock pit is formed on the disc in which information has been recorded and a reference clock (see FIG. 2C) is generated on the basis of the clock pit. A sawtooth wave signal (see FIG. 2D) is generated in synchronism with the reference clock. Then, the edge position of the information pit is detected by detecting the timing at which the sawtooth wave signal and the binary RF signal cross each other.

Magneto-optical recording systems use an MO disc in which a pit is formed by a partial inversion of magnetization on a magneto-optical film. When the recording method in which the edge position of the information pit is shifted stepwise from the predetermined position in response to the recording information is applied to a magneto-optical recording system, the following disadvantages must be overcome.

Magneto-optical disc recording systems include magnetic field modulation system and a light modulation system. While a magnetic field modulation system is capable of overwrite, the magnetic field modulation system must modulate the magnetic field. There is then the drawback that the magnetic field modulation system is large in energy loss. Also, the magnetic field modulation system needs much energy because a laser is continuously energized.

On the other hand, while the light modulation system is small in energy loss because a laser is energized intermittently, the light modulation system is incapable of overwrite. In order to effect the overwrite, some recording media are formed as a multi-layer structure. According to this system, two magnets are required to record data on such recording media and laser powers of three levels are required.

The conventional magneto-optical disc recording method that is capable of the overwrite is large in energy loss and makes the recording apparatus become complicated in arrangement.

OBJECTS AND SUMMARY OF THE INVENTION

Therefore, it is a general object of the present invention to provide an improved magneto-optical recording method and an improved magneto-optical recording and reproducing apparatus in which the aforesaid shortcomings and disadvantages encountered with the prior art can be eliminated.

More specifically, it is an object of the present invention to provide a magneto-optical recording method and a magneto-optical recording and reproducing apparatus in which a satisfactory signal characteristic can be obtained even when information is recorded at high recording density without heat accumulation effect.

It is another object of the present invention to provide a magneto-optical recording method and a magneto-optical recording and reproducing apparatus in which data can be overwritten on a magneto-optical disc by a simple arrangement with a small energy.

It is a further object of the present invention to provide a magneto-optical recording method and a magneto-optical recording and reproducing apparatus in which data recorded at a high density can be overwritten with a small energy.

It is yet a further object of the present invention to provide a magneto-optical recording and reproducing apparatus of a simple arrangement which can accurately reproduce information recorded at high recording density.

It is yet a further object of the present invention to provide a magneto-optical recording and reproducing apparatus of a simple arrangement which can be produced inexpensively.

It is still a further object of the present invention to provide a magneto-optical recording and reproducing apparatus in which a heat accumulation effect upon recording is negligible.

It is still a further object of the present invention to provide a magneto-optical recording and reproducing apparatus in which a satisfactory signal characteristic can be obtained even when data is recorded with high recording density.

According to a first aspect of the present invention, there is provided a magneto-optical disc recording method which comprises the steps of generating a recording fundamental clock synchronized with a reference clock recorded in advance on a magneto-optical recording medium, generating an alternating field having the same frequency as that of the recording fundamental clock, applying the alternating field to a particular recording position of the magneto-optical recording medium, changing a phase of the recording fundamental clock in response to data to be recorded, and irradiating a spot of a predetermined intensity necessary for thermo-magnetic recording to the particular recording position of the magneto-optical recording medium on the basis of the recording fundamental clock whose phase is changed.

According to a second aspect of the present invention, there is provided a magneto-optical recording apparatus which comprises an optical pickup device and a PLL (phase locked loop) circuit serving as clock generating means for generating a recording fundamental clock. The recording fundamental clock is synchronized with a reference clock recorded in advance on a magneto-optical disc serving as a magneto-optical recording medium. A magnetic head serves as magnetic field generating means for generating an alternating field having the same frequency as that of the recording fundamental clock and applies the same to a particular recording position of the magneto-optical disc. A phase modulating circuit serves as phase control means for changing a phase of the recording fundamental clock in response to data to be recorded. A pulse generating circuit, a laser control circuit and the optical pickup device serves as light irradiating means for irradiating a spot of a predetermined intensity necessary for thermo-magnetic recording to the particular position of the magneto-optical disc on the basis of the recording fundamental clock whose phase is changed by the phase modulating circuit.

In accordance with a third aspect of the present invention, there is provided in the magneto-optical recording apparatus in which the aforesaid magnetic field generating means comprises a tank circuit formed of a coil provided on the magnetic head and a capacitor connected in parallel to the coil.

Further, the above light irradiating means irradiates the spot to the particular recording position of the magneto-optical disc near a peak value of the alternating field.

Further, the magneto-optical recording apparatus may further comprise a phase compensating circuit serving as adjusting means for adjusting a timing at which the alternating field generated from the above magnetic field generating means is changed and a timing at which the spot is irradiated by the above light irradiating means.

Further, the above light irradiating means can be made to irradiate the spot of the predetermined intensity necessary for thermo-magnetic recording to the particular position at every half period of the alternating field applied to the particular recording position of the magneto-optical disc.

Further, the reference clock can be recorded by a clock pit formed of a concave or convex portion formed on a reflection surface of the magneto-optical disc. The clock generating means detects the clock pit CP on the basis of the change of light amount of a reflected laser light continuously radiated on the magneto-optical disc to thereby generate the recording fundamental clock synchronized with the reference clock.

Furthermore, the reference clock can be recorded by a groove wobbled on the reflection surface of the magneto-optical disc at a constant period. In this case, the clock generating means generates the recording fundamental clock synchronized with the reference clock on the basis of the change of light amount of the reflection of the laser light radiated on the magneto-optical disc.

In order to achieve a high density recording by the above magneto-optical recording method, according to the magneto-optical recording apparatus of the present invention, each time the magnetic field generating means alternately applies a positive or negative magnetic field to the particular recording position of the magneto-optical disc, the above light irradiating means irradiates the spot of the predetermined intensity necessary for thermo-magnetic recording to the particular recording position. In this way a pit in which an edge position is shifted stepwise from a predetermined reference position in response to data to be recorded can be recorded on the magneto-optical disc.

Further, a pit whose front end and rear end edge positions are shifted stepwise from the predetermined reference position in response to the data to be recorded can be recorded on the magneto-optical disc.

The pit is formed by partially inverting a magnetization direction of a magneto-optical film. An information pit is recorded on the magneto-optical disc by stepwise shifting the edge position of the pit from the predetermined reference position in response to the data to be recorded. This shift is within a range corresponding to a predetermined shift period smaller than a transition period of a reproduced signal. The transition period of the reproduced signal is determined in response to a transfer characteristic of an optical system that detects a reproduced signal associated with the information pit on the basis of the Kerr rotational angle direction of a reflected light when the laser light is irradiated on the magneto-optical disc.

Further, the magneto-optical recording and reproducing apparatus according to the present invention reproduces information from a magneto-optical disc in which information is recorded by stepwise shifting the pit edge position from a predetermined reference position. Such magneto-optical recording and reproducing apparatus comprise an optical pickup device, an RF (radio frequency) circuit and a PLL circuit serving as clock generating means for generating a recording fundamental clock synchronized with a reference clock recorded in advance on the magneto-optical disc. The optical pickup device and the RF circuit serve as an optical detection system for irradiating the magneto-optical disc with a laser light to thereby detect a reproduced signal (MO) signal corresponding to the pit on the basis of the Kerr rotational angle direction of a reflected light. An A/D converting circuit serves as a level detecting means for detecting a reproduced level of the reproduced signal (MO signal) at a timing defined by the recording fundamental clock. A two-dimensional decoder serves as judging means for judging recorded information corresponding to a shift amount of the edge position of the pit on the basis of the reproduced level.

In this type of magneto-optical disc recording apparatus, a coil generates the alternating field having the same frequency as that of the clock generated by the PLL circuit and applies the same to the magneto-optical disc. The optical pickup device irradiates a light on the magneto-optical disc on the basis of a clock whose phase is changed in response to a recording signal. Accordingly, it is possible to realize the magneto-optical disc recording apparatus of a simple arrangement which can overwrite data with a small energy loss.

Furthermore, according to this type of magneto-optical disc recording method, the alternating field having the same frequency as that of the clock is applied to the magneto-optical disc and the light is irradiated on the magneto-optical disc in synchronism with the clock whose phase is changed in response to the recording signal. Therefore, it becomes possible to overwrite data at high density with a small energy.

Furthermore, the magneto-optical recording apparatus of the present invention employs a recording method based on an edge position modulation in which the edge position of the pit is shifted stepwise from the predetermined reference position in response to the data to be recorded. Therefore, the dynamic range of the length of each pit to be recorded can be lowered so that the so-called heat accumulation effect can be made substantially negligibly small. Thus, even when data is recorded at high recording density, a stable and satisfactory signal characteristic can constantly be obtained.

Furthermore, in a magneto-optical recording and reproducing apparatus according to the present invention, the edge position of the pit is shifted stepwise from the predetermined reference position in response to data to be recorded within a range corresponding to the predetermined shift period smaller than the transition period of the reproduced signal determined in response to the transfer characteristic of the optical detection system. Therefore, upon playback, the reproducing level is detected at one sample timing in the transition period of the reproduced signal (MO signal), whereby recording information corresponding to the shift amount of the edge position of the pit can be judged reliably. Therefore, it becomes possible to reproduce information of high recording density accurately by an apparatus with a simple arrangement.

The above and other objects, features, and advantages of the present invention will become apparent from the following detailed description of illustrative embodiments thereof to be read in conjunction with the accompanying drawings, in which like reference numerals are used to identify the same or similar parts in the several views.

DETAILED DESCRIPTION OF THE PREFERRED EMBODIMENTS

Embodiments of the present invention will hereinafter be described with reference to the drawings.

Figure 3:
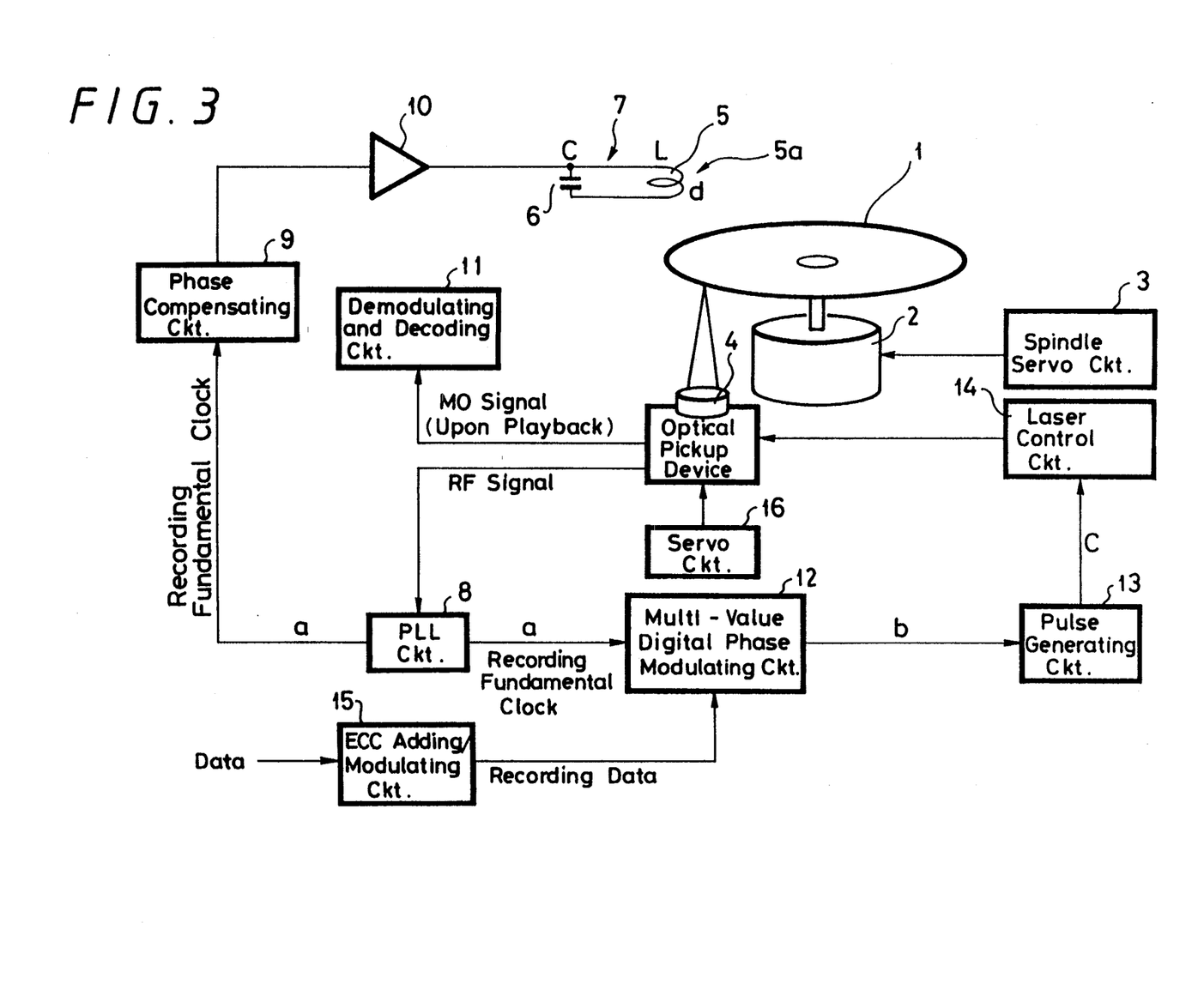
FIG. 3 is a block diagram showing an arrangement of a magneto-optical disc recording apparatus according to an embodiment of the present invention.

FIG. 3 is a block diagram showing a circuit arrangement of a magneto-optical disc recording apparatus according to an embodiment of the present invention.

As shown in FIG. 3, a magneto-optical disc 1 is rotated at a predetermined speed by a spindle motor 2 that is driven under control of a spindle servo circuit 3. An optical pickup device 4 irradiates a predetermined recording position of the magneto-optical disc 1 with a laser light and records data on the optical disc 1 by the radiation of a laser beam spot of a predetermined diameter having a predetermined intensity necessary for thermal-magnetic recording. Also, the optical pickup device 4 detects a reflected light from the magneto-optical disc 1 and outputs a detection signal to a demodulating and decoding circuit 11. The demodulator and decoder circuit 11 demodulates the signal (MO signal) supplied thereto from the optical pickup device 4. The demodulating and decoding circuit 11 further decodes the demodulated signal and outputs the same to a circuit not shown. The optical pickup device 4 is operated in the focus servo mode, the tracking servo mode and the sled servo mode under control of a servo circuit 16.

An ECC (error correction code) adding and modulating circuit 15 adds an error correction code to data supplied therefrom from a circuit not shown. Then, the ECC adding and modulating circuit 15 modulates the data having the error correction code and outputs the same to a phase modulating circuit 12 as recording data. A PLL (phase locked loop) circuit 8 is supplied with a reproduced signal (RF signal) that is output from the optical pickup device 4 when the optical pickup device 4 detects a clock pit CP (see FIG. 8 which will be described later) previously formed on the magneto-optical disc 1 as a pre-pit by an embossing process or the like and then generates a recording fundamental clock a of a constant period T synchronized with the RF signal. The recording fundamental clock a is supplied from the PLL circuit 8 to the phase modulating circuit 12 and an output b of the phase modulating circuit 12 is supplied to a pulse generating circuit 13. The pulse generating circuit 13 generates a pulse c that is synchronized with the leading and trailing edges of the output from the phase modulating circuit 12 and outputs the same to a laser control circuit 14. The laser control circuit 14 drives a semiconductor laser housed in the optical pickup device 4 in response to a pulse c supplied thereto from the pulse generating circuit 13.

The recording fundamental clock a generated by the PLL circuit 8 is compensated in phase by a phase compensating circuit 9 and then supplied through a buffer amplifier 10 to a coil 5 of a magnetic head 5a. The coil 5 and a capacitor 6 constitute a tank circuit 7. The magnetic head 5a having the coil 5 is located at the position opposing the position at which the optical pickup device 4 irradiates a laser light across the magneto-optical disc 1. That is, the magnetic head 5a is located at the position opposing a particular recording position on the upper surface of the magneto-optical disc 1 and the optical pickup device 4 is located at the position opposing the lower surface of the magneto-optical disc 1 at the recording position. The magnetic head 5a and the optical pickup device 4 are translated together in the radial direction of the magneto-optical disc 1 by a common feed mechanism (not shown) to effect a, thereby the tracking control and sled control.

Operation of this magneto-optical disc recording apparatus will be described below. The magneto-optical disc 1 is rotated by the spindle motor 2 at the predetermined speed. The optical pickup device 4 continuously irradiates the magneto-optical disc 1 with a laser light whose intensity level Ll is lower than intensity level Lh of a laser light output from the optical pickup device 4 in response to a recording pulse, which will be described later on, thereby to reproduce the clock pit CP from the reflected light thereof. The RF signal corresponding to the clock pit CP is supplied from the optical pickup device 4 to the PLL circuit 8. The PLL circuit 8 generates the recording fundamental clock a (frequency value thereof is made the same as that of the recording fundamental clock of recording data output from the modulating circuit 15) synchronized with the reproduction of the clock pit CP. The recording fundamental clock a is supplied through the phase compensating circuit 9 and the buffer amplifier 10 to the tank circuit 7. An inductance L of the coil 5 and a capacity C of a capacitor 6 are set such that a resonance frequency of the tank circuit 7 becomes the same frequency as that of the recording fundamental clock a. Thus, the coil 5 generates an alternating field that changes with the same frequency as that of the recording fundamental clock a, and applies the same to the magneto-optical disc 1. By the resonance operation of the tank circuit 7, a resonance current is supplied to the coil 5 and the capacitor 6 so that the coil 5 can generate the alternating field with small energy.

Figure 4A:
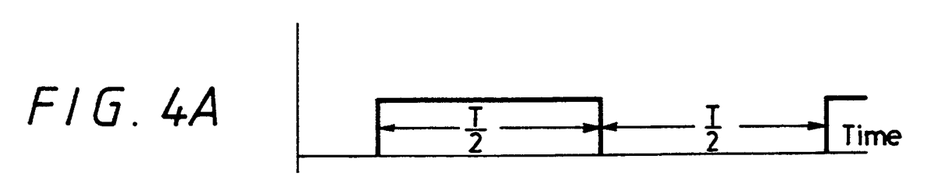
FIGS. 4A through 4D are timing charts used to explain operation of the embodiment shown in FIG. 3.

On the other hand, the recording fundamental clock a generated by the PLL circuit 8 also is supplied to the phase modulating circuit 12 and the phase thereof is modulated in response to the recording data supplied thereto from the modulating circuit 15 (i.e., the phase is shifted stepwise in response to the recording data). More specifically, the recording fundamental clock a (shown in FIG. 4A) generated by the PLL circuit 8 is phase-modulated by the phase modulating circuit 12 and thereby provided as a signal shown in FIG. 4B. In this embodiment, positions of the leading and trailing edges of the recording fundamental clock a are shifted to one of four shifted positions in response to the recording data. While there are provided four shift positions in this embodiment as described above, the present invention is not limited thereto and there may be provided eight shift positions or more.

Figure 4B:
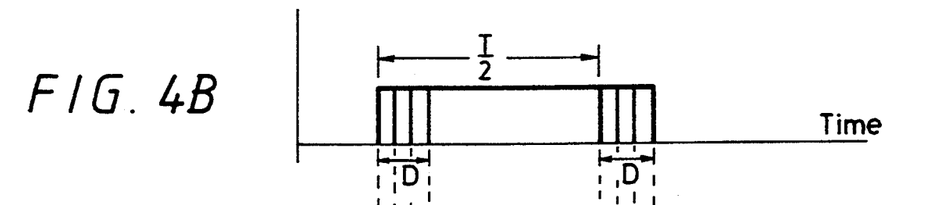
Figure 4C:
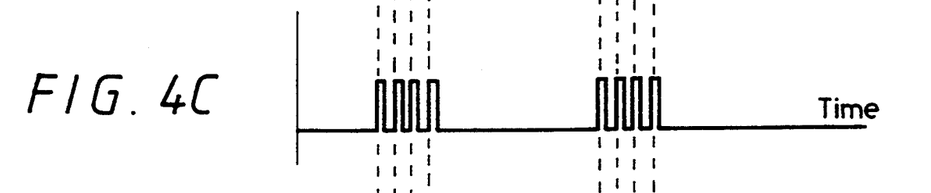
Figure 4D:
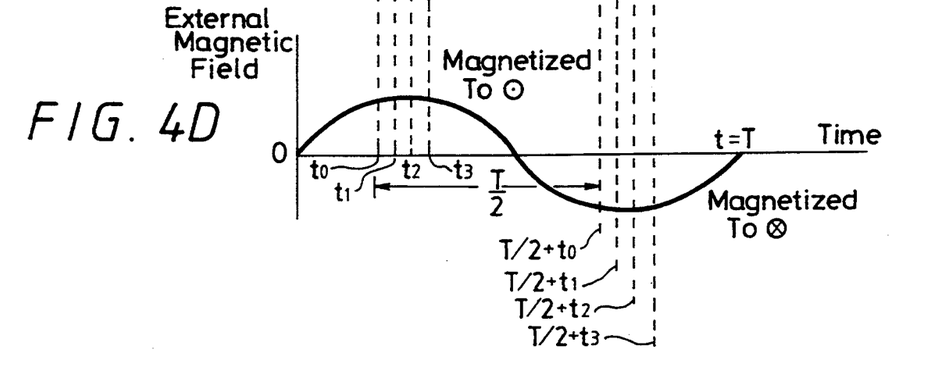

The pulse generating circuit 13 generates a recording pulse c shown in FIG. 4C in synchronism with the leading and trailing edges of the clock b supplied thereto from the phase modulating circuit 12. This recording pulse c is supplied to the laser control circuit 14. The laser control circuit 14 drives the semiconductor laser housed within the optical pickup device 4 at timing in which this recording pulse c is input thereto, thereby generating a laser light having an intensity level Lh higher than the intensity level l of the laser light continuously radiated on the magneto-optical disc 1. The intensity level Lh of the laser light is set to a value sufficient so that the magneto-optical film of the magneto-optical disc 1 is heated in excess of the Curie temperature to effect the thermo-magnetic recording. The alternating field generated by the coil 5 is changed with the same frequency as that of the recording fundamental clock a supplied thereto from the PLL circuit 8 through the phase compensating circuit 9 and the buffer amplifier 10 as shown in FIG. 4D. The phase compensating circuit 9 compensates for the timing (phase) so that the laser light is irradiated on the magneto-optical disc 1 near the peak value of the alternating field. That is, the timing is adjusted by the phase compensating circuit 9 such that a center of a range D in which the leading and trailing edges change as shown in FIG. 4B occur at the peak (i.e., extreme) values of the alternating field.

In FIG. 4D, when the alternating field is positive, for example, the magneto-optical disc 1 is subjected at its particular recording position opposing the magnetic head 5a to a magnetic field whose magnetic flux penetrates the magneto-optical disc in a direction 1 from its lower surface to its upper surface. The direction of such magnetic field is represented by symbol ⊙ in FIG. 4D. When the alternating field is negative, the magneto-optical disc 1 is subjected at its particular recording position to a magnetic field whose magnetic flux penetrates the magneto-optical disc 1 in a direction from its upper surface to its lower surface. The direction of such magnetic field is represented by mark ⓧ in FIG. 4D. In the following description, the direction of the magnetic field perpendicular to the sheet of drawing and which penetrates the magneto-optical disc 1 from the rear surface to the front surface is represented by symbol ⊙ and the direction of the magnetic field that penetrates the magneto-optical disc 1 from the front surface to the rear surface thereof is represented by symbol ⓧ.

Of course, if the level of the alternating field generated by the coil 5 is set to be larger, then even when a laser light is generated at the position considerably shifted from the peak value of the external magnetic field, it is possible to record data on the magneto-optical disc 1. If so, the Q of the tank circuit 7 composed of the coil 5 and the capacitor 6 must be increased, making the magneto-optical disc recording apparatus large in size. It is therefore preferable that the laser light be generated near the peak value of the external magnetic field.

Figure 5A:
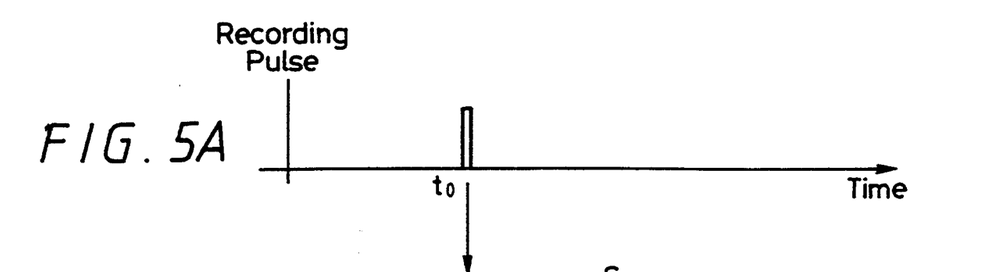
FIGS. 5A and 5B are diagrams used to explain a pit formed by one recording pulse in the embodiment shown in FIG. 3.
Figure 5B:
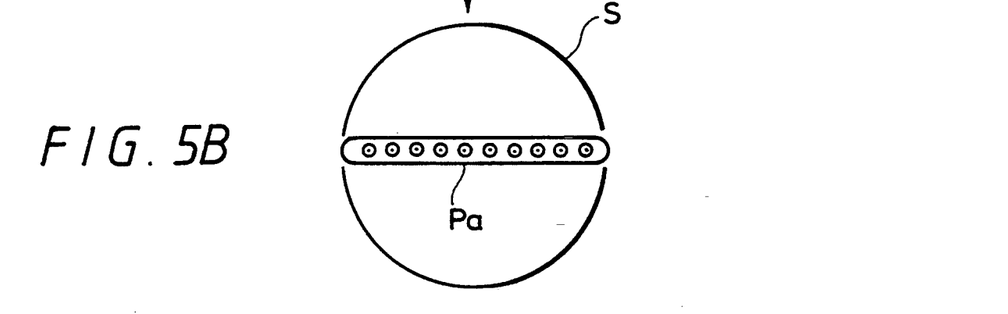

FIGS. 5A and 5B show how a pit is magneto-optically formed on the magneto-optical disc 1. As shown in FIG. 5A, when the recording pulse is supplied to the optical pickup device 4 from the laser control circuit 14 at timing point $t=t_0$, a laser light is irradiated on the magneto-optical disc 1 in response to the recording pulse. The magneto-optical disc 1 is radiated with a laser light having a beam spot S of a constant diameter having a strength sufficient so that the thermo-magnetic recording can be effected. Then, the magneto-optical film within the area of the beam spot S is heated at temperature in excess of Curie temperature. Thus, a pit Pa corresponding to the direction (direction shown by symbol ⊙) of the magnetic field applied to the magneto-optical disc 1 by the coil 5 is formed on the magneto-optical disc 1 as shown in FIG. 5B.

Figure 6A:
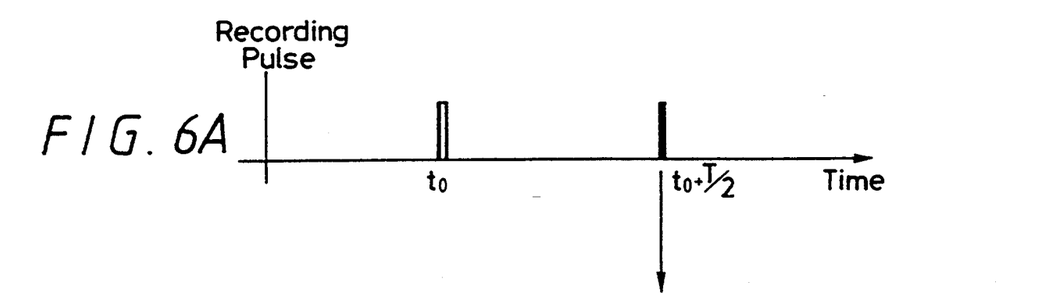
FIGS. 6A and 6B are diagrams used to explain a pit formed by two recording pulses in the embodiment shown in FIG. 3.
Figure 6B:
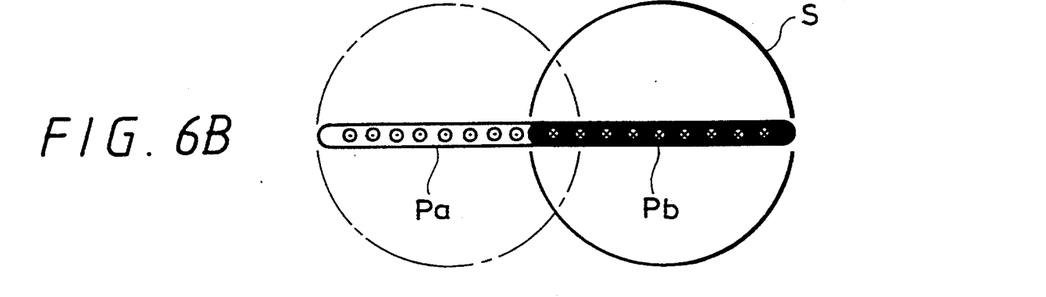

Thereafter, as shown in FIG. 6A, when the recording pulse is supplied again to the optical pickup device 4 at timing point $t=t_0+T/2$ (T is the period of the recording fundamental clock a), the coil 5 generates a magnetic flux having a polarity different from that in the case of timing point $t=t_0$. As a consequence, as shown in FIG. 6B, a part of the pit Pa shown in FIG. 5B is overwritten to form a pit Pb having an opposite polarity (direction shown by symbol ⓧ).

Figure 7A:
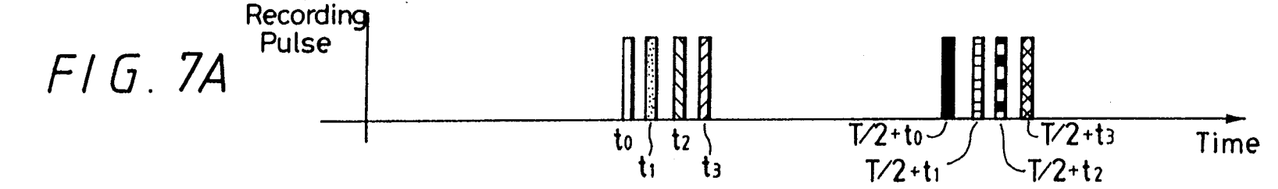
FIGS. 7A through 7D are diagrams used to explain a pit formed by eight recording pulses in the embodiment shown in FIG. 3.
Figure 7B:
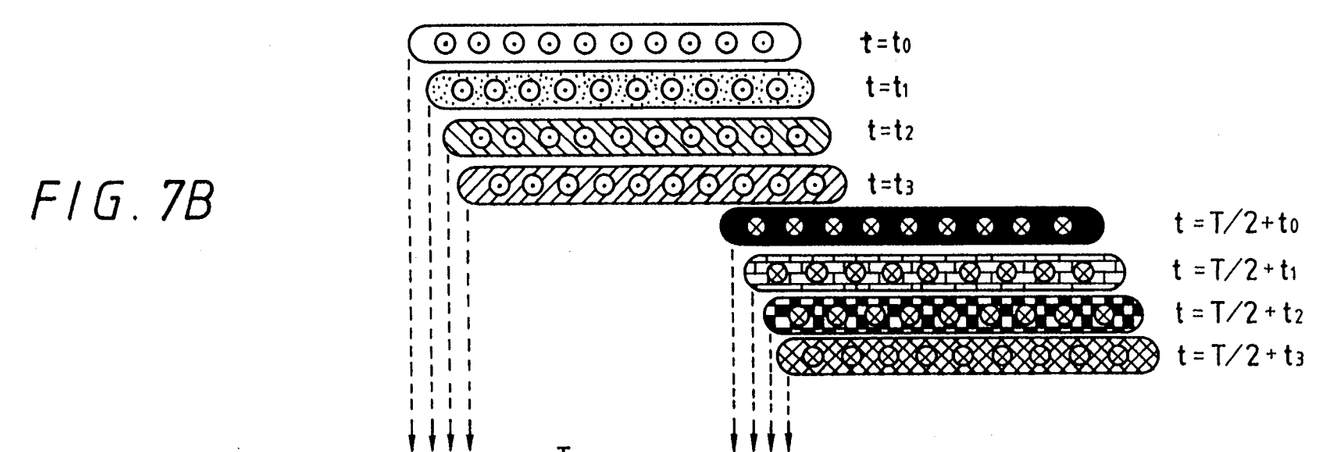
Figure 7C:
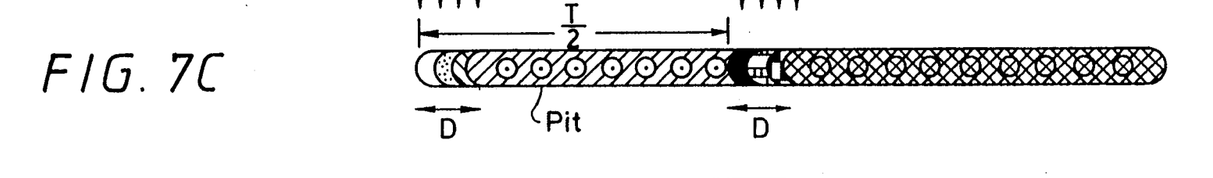
Figure 7D:
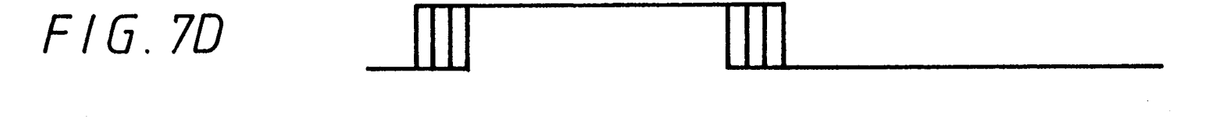

Therefore, as shown in FIG. 7A, if the recording pulse is generated from the laser control circuit 14 at any one timing of timing points $t_0$ to $t_3$ and $T/2+t_0$ to $T/2+t_3$, then any two pits of pits shown in FIG. 7B are formed in response to the timing at which the recording pulse is generated. This is collectively illustrated in FIG. 7C. That is, the front and rear edges of pits having a length corresponding to ½ period (T/2) of the recording fundamental clock a are changed stepwise in the range shown by D in FIG. 7C in response to the recording data. Alternatively, it is to be understood that the above operation in which the front edge of the pit whose length corresponding to ½ period (T/2) of the recording fundamental clock is changed stepwise in the range shown by D in response to the recording data is repeated at every period of T/2 as shown in FIG. 7D. Data is recorded on the magneto-optical disc 1 by recording such pits on the magneto-optical disc 1.

Referring back to FIG. 3, upon reproduction, the laser control circuit 14 controls the optical pickup device 4 so that the optical pickup device 4 continuously irradiates the magneto-optical disc 1 with the laser light of level Ll lower than that in the recording mode. Then, the recorded signal (MO signal) recorded on the magneto-optical disc 1 is reproduced from the Kerr rotational angle of the reflected light. The reproduced signal is supplied to the demodulating and decoding circuit 11, in which it is demodulated and then decoded.

While a phase compensating circuit 9 is interposed between the PLL circuit 8 and the buffer amplifier 10 as described above, the present invention is not limited thereto. For example, the phase compensating circuit 9 could be disposed between the phase modulating circuit 12 and the pulse generating circuit 13 to thereby adjust the timing of the signal supplied to the optical pickup device 4.

Further, while the clock pit is recorded on the magneto-optical disc 1 by a concave or convex portion physically formed on the reflection surface of the magneto-optical disc 1 as described above, the present invention is not limited thereto. For example, a pregroove, formed of a groove wobbled at a constant period can be formed on the reflection surface of the magneto-optical disc 1 and the recording fundamental clock a can be reproduced from this pregroove.

Figure 8:
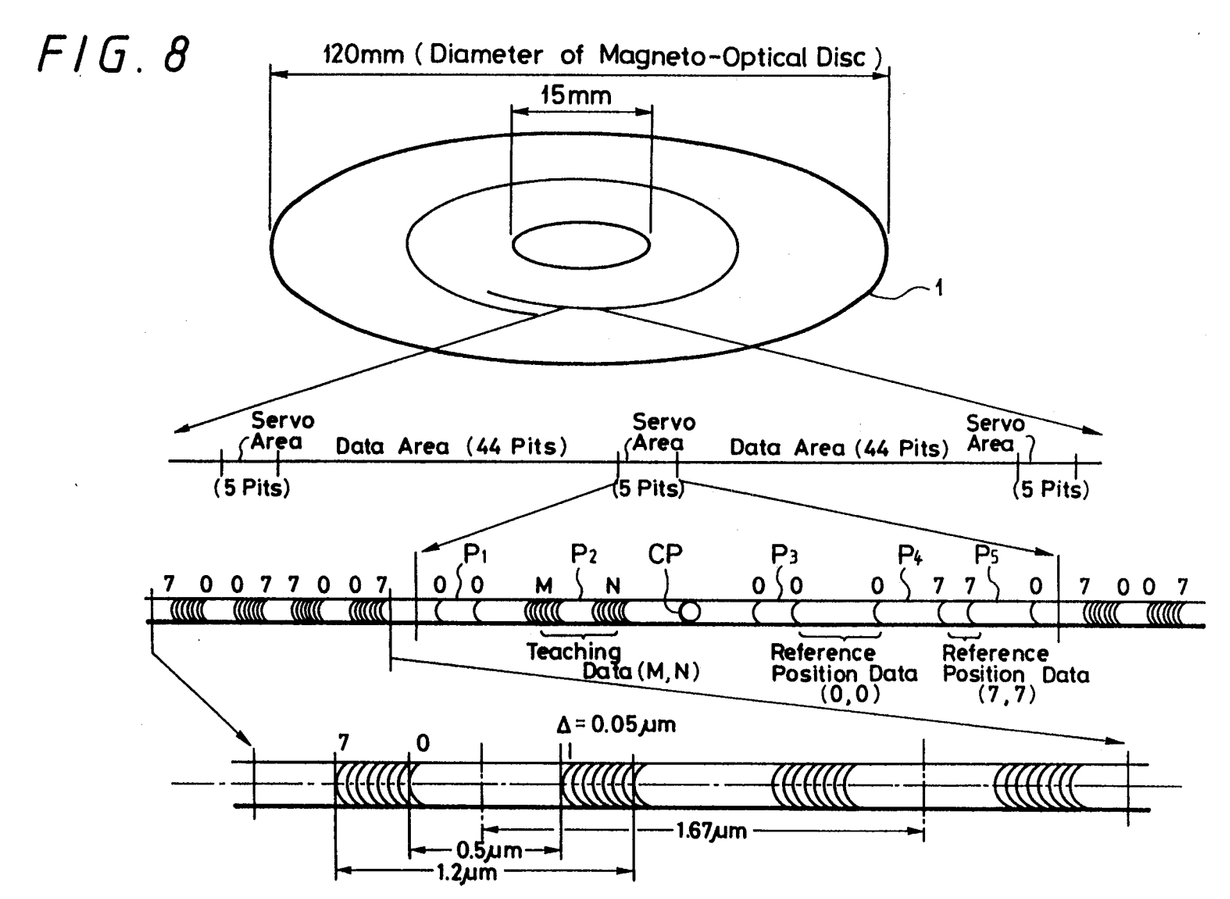
FIG. 8 is a diagram showing a recording format of a recording medium to which there is applied a magneto-optical recording method according to the present invention.

FIG. 8 shows an example of a fundamental format of a magneto-optical disc to which a recording method of the present invention is applied.

In this embodiment, a pit train is recorded at a track pitch of 1.6 μm according to the CLV mode on the magneto-optical disc 1 having a diameter of 120 mm in which pits are formed by the inversion of partial magnetization of the magneto-optical film. All data is recorded as shift amounts of eight stages of the edge positions of the front end (leading edge) and rear end (trailing edge) of each of pits located at every constant period of 1.67 μm. A unit shift amount Δ that is one unit of this shift amount is set to 0.05 μm.

Since information of 3 bits each can be recorded by the shift amounts of eight stages of the edge positions of respective pits thus located, a linear recording information density in the pit train direction is 0.28 μm/bit which is twice that of the current CD system or more.

For example, the upper limit of the linear velocity may be set to 1.2 m/s in the CD system, data bits of 8 bits to be recorded may be converted into information of 14 bits plus 3 margin bits (i.e., channel bit of 17 bits in total according to an EFM (eight to fourteen modulation)). In this example, considering the EFM modulation, the linear recording information density is about 0.6 μm/bit. That is, since the shortest pit of about 0.9 μm corresponds to channel bit of 3 bits, we have:

$$(0.9 \div 3) \times (17/8) = \text{about } 0.6 \text{ μm/bit}$$

Figure 9:
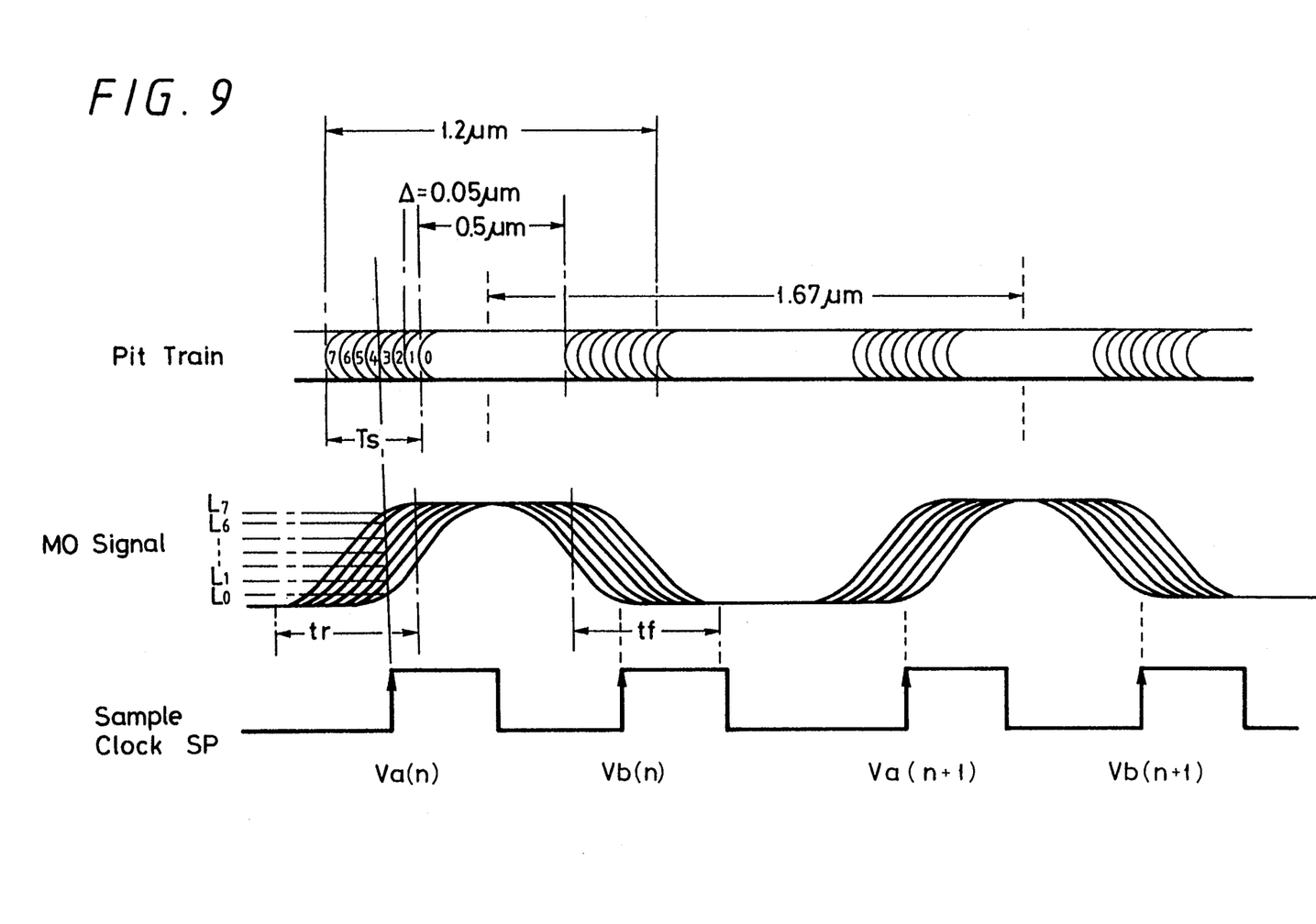
FIG. 9 is a diagram used to explain a structure of an information pit recorded on a recording medium to which there is applied a magneto-optical recording method according to the present invention.

As shown in FIG. 9, the edge positions of pits recorded on the magneto-optical disc 1 are shifted stepwise from the central reference position of the pits in response to digital information to be recorded. To this end, a shift period Ts ($=\Delta \times 7$) is set within a range corresponding to a leading edge period tr or trailing edge period tf which is a transition period (period other than stationary state in which 0 level or saturation level is effected) of an MO signal (differential detection signal). The MO signal is determined in response to a transfer characteristic of a differential optical detection system of the optical pickup device 4.

Figure 10:
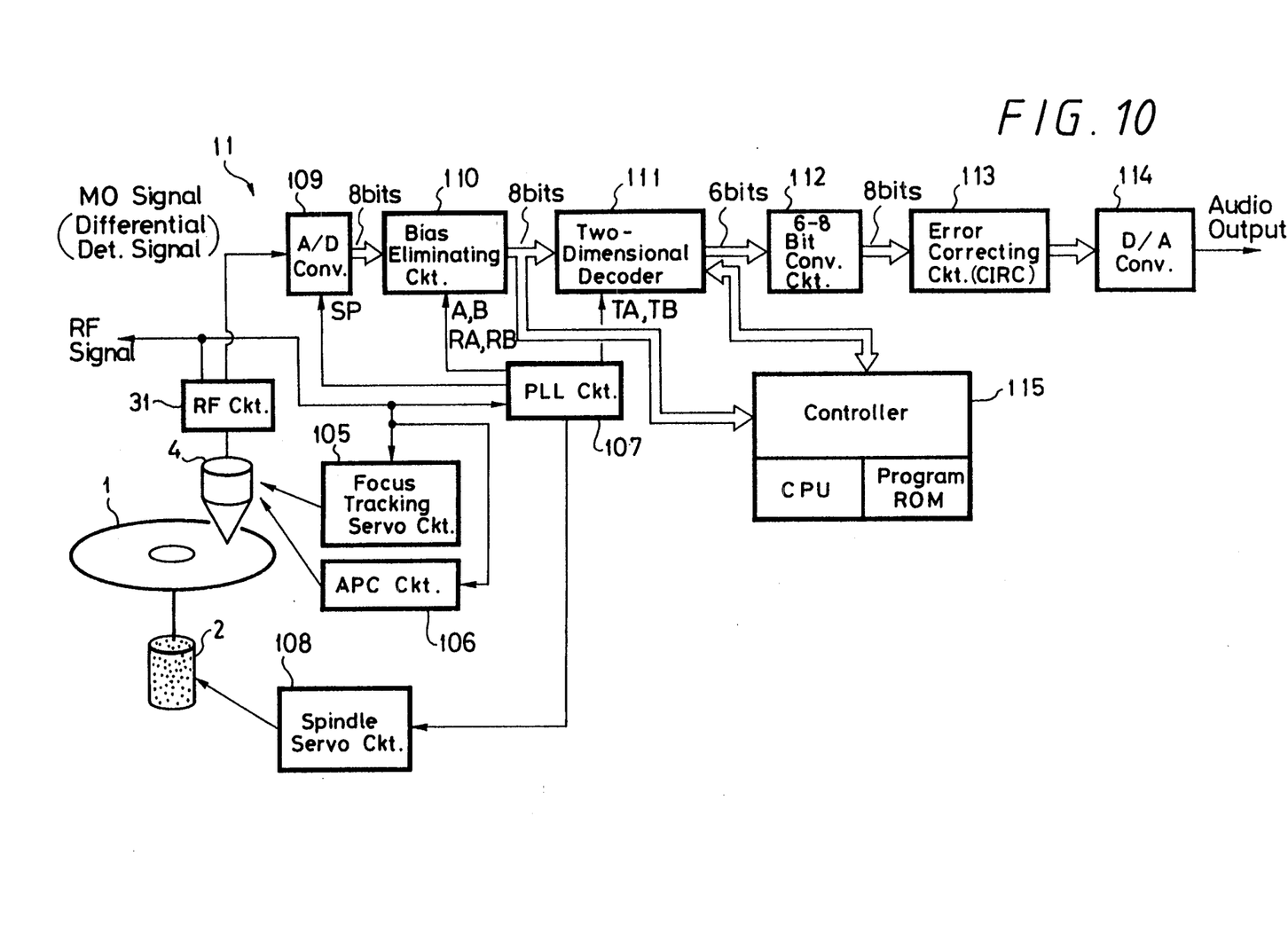
FIG. 10 is a block diagram showing a circuit arrangement of a magneto-optical recording and reproducing apparatus according to another embodiment of the present invention.

The above-mentioned MO signal is output from an RF circuit 31 that processes a detection signal from the optical pickup device 4 of a reproducing apparatus shown in FIG. 10. The transition period is determined by the transfer characteristic of the optical pickup 4. It is customary that the transfer characteristic of the optical system is determined by an MTF (modulation transfer function) that is an absolute value of an OTF (optical transfer function). The MTF is determined depending on the numerical aperture NA of the lens and the wavelength λ of the laser light.

If the unit shift amount Δ is shifted at a unit smaller than 0.05 μm within the above-mentioned shift period Ts, then the recording density can be increased more.

Reproducing levels L0 to L7 corresponding to the shift amounts 0 to 7 of the edge positions of the pit can be obtained by analog-to-digital (A/D) converting the MO signal by a sample clock SP that is synchronized with the central reference position of the thus recorded pit from a phase standpoint. The condition that the reproducing levels L0 to L7 can be detected at one sample timing in the transition period of the MO signal is expressed as:

shift period Ts ≦ transition period (leading edge period tr or trailing edge period tf)

It is preferable that the sampling timing of the sample clock SP correspond to the center of the shift period Ts. If this sample timing is utilized, it becomes possible to detect the reproducing level over the whole range of the transition period of the MO signal.

Referring back to FIG. 8, a servo area formed of five servo pits P1 to P5 is inserted into the magneto-optical film of the magneto-optical disc 1 between its data areas in which 44 data pits corresponding to data to be recorded are recorded. The five servo pits P1 to P5 are, recorded by thermo-magnetic recording based on a recording method in which the laser spot S of a predetermined intensity is radiated at every semi-period of the alternating field in the format processing of the magneto-optical disc 1, i.e., the initialization process. The clock pit CP is formed on each servo area in advance by the embossing process or the like as the pre-pit, separate from the servo pits. The clock pit CP is formed with a very high positional accuracy in the manufacturing process of the magneto-optical disc 1.

Of the five pits P1 to P5 recorded on the servo area, two pits are allocated to teaching pits P1, P2 and remaining three pits are allocated to reference pits P3 to P5, respectively. The position of the front edge of the teaching pit P2 in the left-hand side (as shown in FIG. 8) is set to a position M of any of shift positions of eight stages from 0 to 7 and the position of the rear edge thereof in the right-hand side is set to a position N of any of shift positions of eight stages from 0 to 7.

Combinations of the position M of the front edge and the position N of rear edge of the teaching pit P2 are regularly set so as to provide different combinations in each of the servo areas. That is, M and N are set to (0, 0) in the first servo area and set to (0, 1) in the next servo area. Similarly, combinations of M and N are regularly set to (0, 2), (0, 3), . . . , (7, 6), (7, 7). Therefore, in 64 (=8×8) servo areas, teaching pits P2 will exhibit all possible positional combinations of the front and rear edges of the teaching pit P2.

In that case, the teaching pit P1 becomes a dummy pit. More specifically, teaching data can be formed not on respective end edges of the pit P2 but on respective end edges of the pit P1 theoretically. According to this arrangement, however, a pit adjoining the left (as shown in FIG. 8) of the pit P1 is a data pit in the data area and accordingly the position of such edge is changed in association with data. As a result, a degree of interference relative to the teaching pit P1, particularly, the edge on the data area side is changed by the data value. Accordingly, it becomes impossible to use this edge for teaching data purposes. For this reason, as in this embodiment, it is preferable that teaching data be formed not on respective end edges of the teaching pit P1 but on respective end edges of the teaching pit P2. According to this arrangement, the edge of reference pit P3 adjoining the rear end edge of the teaching pit P2 and the teaching pit P1 adjoining the front end edge of the former remain constant as (0, 0) (i.e., not changed) so that, when the teaching data of the teaching pit P2 is read out, the teaching data is affected by a constant intrasymbol interference. Therefore, a constant pattern can be obtained.

Reference pits P3 to P5 are pits that are used to obtain data at the reference positions (0, 0) and (7, 7). The reference position data may be formed at respective end edges of the pit P5, for example, from a theoretical standpoint. If so, however, a degree of interference from the adjacent data areas is changed by recorded data similarly as described in respect to the discussion of pit P1. For this reason, it is preferable that reference position data not be formed at the rear end edge of the reference pit P5 in the right-hand side (as shown in FIG. 8).

FIG. 10 is a block diagram showing a circuit arrangement of a magneto-optical recording and reproducing apparatus according to another embodiment of the present invention.

As shown in FIG. 10, the magneto-optical disc 1 is rotated by the spindle motor 2. On the magneto-optical disc 1, there is recorded information according to the recording format shown in FIG. 8. That is, digital information is recorded on the magneto-optical disc 1 by stepwise shifting at least one position of the front end and rear end edges of the information pit from the predetermined reference position. On the magneto-optical disc 1, there are formed the servo areas at the constant period, the teaching pits P1, P2 and the reference pits P3 to P5. Data pits are formed in the data area.

The optical pickup device 4 irradiates the magneto-optical disc 1 with a laser beam and a signal recorded on the magneto-optical disc 1 is reproduced from a reflected light of the magneto-optical disc 1. A detected signal from the optical pickup device 4 is processed by the RF circuit 31, in which it is separated into an RF signal corresponding to the change of the amount of reflected light of the laser beam radiated on the magneto-optical disc 1 and an MO signal corresponding to the direction of Kerr rotational angle of the reflected light of the laser beam radiated on the magneto-optical disc 1. More specifically, the optical pickup device 4 comprises a laser light source such as a laser diode or the like, optical parts such as a collimator lens, an objective lens, a polarizing beam splitter, a cylindrical lens or the like, and photo-detectors separated to predetermined locations and etc. The optical pickup device 4 irradiates a laser light on a target track of the magneto-optical disc 1 and outputs detection signals corresponding to a P-polarized component and an S-polarized component from the reflected light. The RF circuit 31 differentially amplifies the detection signal of the P-polarized component and the detection signal of the S-polarized component to thereby detect a rotation of a polarized plane that was effected on the laser light by the, magneto-optical film (vertical magnetization film) of the magneto-optical film 1, i.e., the Kerr rotational angle. Then, the RF circuit 31 outputs the signal corresponding to the Kerr rotational angle as the MO signal. At the same time, the RF circuit 31 amplifies a sum of the detection signal of the P-polarized component and the detection signal of the S-polarized component to thereby detect an intensity of a reflected light amount based on a diffraction phenomenon that was effected on the laser light by the reflection surface of the magneto-optical disc 1. The signal corresponding to the reflected light amount is output from the RF circuit 31 as the RF signal.

The RF signal output from the RF circuit 31 is supplied to a focus tracking servo circuit 105, an APC (automatic phase control) circuit 106 and a PLL (phase-locked loop) circuit 107. The focus tracking servo circuit 105 generates a focus error signal and a tracking error signal from the input signal and executes the focus control and the tracking control in response to error signals. Further, the APC circuit 106 effects a servo such that a power of the laser light radiated on the magneto-optical disc 1 becomes constant.

The PLL circuit 107 extracts the clock component from the RF signal corresponding to the clock pit CP supplied thereto from the RF circuit 31 to generate the sample clock SP and other clocks which are in a predetermined phase relation. Then, the PLL circuit 107 supplies the clocks to an A/D converting circuit 109, a bias eliminating circuit 110 and a two-dimensional decoder 111. While a PLL circuit utilized in the ordinary CD system or the like reproduces a clock by utilizing all RF signals, the PLL circuit 107 of this embodiment reproduces a clock by utilizing only the RF signal corresponding to the clock pit CP that is formed on the magneto-optical disc 1 by, for example, the embossing process or the like as the pre-pit. Thus, the clock can be reproduced stably without being affected by the data pits recorded on the magneto-optical film. A spindle servo circuit 108 controls the spindle motor 2 so that the magneto-optical disc 1 may be rotated at a constant angular velocity.

On the other hand, the MO signal output from the RF circuit 31 is input to the A/D converting circuit 109, in which it is converted into 8-bit digital data (reproducing level) representative of levels of 256 stages at the timing of leading edge of the sample clock SP. The 8-bit data is supplied to the bias eliminating circuit 110, in which it is eliminated in bias component and then fed to the two-dimensional decoder 111 and a controller 115. The controller 115 is composed of a CPU (central processing unit) that executes various calculations, a program ROM (read-only memory) in which programs executed by the CPU are stored or the like. The controller 115 executes processing in which data reproduced from the teaching pits P1, P2 are mapped onto the two-dimensional decoder 111 or the like.

The two-dimensional decoder 111 decodes a signal supplied thereto from the bias eliminating circuit 110 and supplies an output thereof to a 6-8 bit converting circuit 112. After the 6-8 bit converting circuit 112 accumulated four sets of 6-bit data, the circuit 112 converts the same into three sets of 8-bit data and outputs the same to an error correcting circuit 113. The error correcting circuit 113 corrects an error of input data and then outputs the error-corrected data to a D/A (digital-to-analog) converting circuit 114. The D/A converting circuit 114 converts the input data into an analog signal and the outputs the same to an analog amplifier (not shown).

The bias eliminating circuit 110, the two-dimensional decoder 111 and so on are already described in detail in Japanese patent application No. 5-20876 and corresponding PCT application, International application No. PCT/JP93/00186 and therefore need not be described.

According to this embodiment, since an influence of so-called heat accumulation effect can be suppressed by using the edge position modulation recording method in the recording process of the magneto-optical disc 1, a high recording density can constantly and stably be achieved.

More specifically, if a pit of 0.9 $\mu$m is recorded immediately after a pit of 3.3 $\mu$m was recorded on the basis of the conventional CD recording system, the magneto-optical disc 1 is locally warmed due to the so-called heat accumulation effect. When the pit of 3.3 $\mu$m is being recorded so that the pit of 0.9 $\mu$m is formed with a size larger than the desired shape. As a consequence, the reproduced signal is distorted and a margin used when the digital signal is read out is decreased.

According to the aforesaid embodiment, since the length of the pit falls in a range of from 0.5 to 1.2 $\mu$m, a dynamic range of the length of the recorded pit is low so that the above-mentioned heat accumulation effect or the like becomes negligibly small. Therefore, even when information is recorded at high recording density, a satisfactory signal characteristic can be obtained.

According to the magneto-optical disc recording apparatus and method of the present invention, since the alternating field having the same frequency as that of the clock is applied to the magneto-optical disc and a light is irradiated on the magneto-optical disc on the basis of the clock whose phase is changed in response to the recording signal, it is possible to realize a simplified-optical disc recording apparatus and method which can overwrite data on the magneto-optical disc with a small energy and at high density.

Further, according to the magneto-optical disc recording and reproducing apparatus of the present invention, since the reproducing level can be detected at one sample timing during the transition period of the reproducing signal, a recorded information associated with the shift amount of the edge position of the data pit can be judged reliably and therefore, information, recorded at high recording density, can be accurately reproduced with a simple arrangement. Thus, the magneto-optical disc recording and reproducing apparatus can be simplified in arrangement and made inexpensive.

Furthermore, according to the magneto-optical recording and reproducing apparatus of the present invention, since the dynamic range of the length of the recorded pit is low, the influence such as the heat accumulation effect or the like upon recording can be made negligibly small. Thus, even when information is recorded at high recording density, there can be obtained a satisfactory signal characteristic.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A magneto-optical recording method comprising the steps of:
   generating a recording fundamental clock synchronized with a reference clock that is recorded in advance on a magneto-optical recording medium;
   generating an alternating field having the same frequency as that of the recording fundamental clock and applying the alternating field to the magneto-optical recording medium;
   changing a phase of the recording fundamental clock to generate a changed phase clock in response to data to be recorded; and
   irradiating a spot of a predetermined intensity necessary for thermo-magnetic recording at a particular recording position of the magneto-optical recording medium on the basis of the changed phase clock.

2. A magneto-optical recording apparatus comprising:
   clock generating means for generating a recording fundamental clock synchronized with a reference clock that is recorded in advance on a magneto-optical recording medium;
   magnetic field generating means for generating an alternating field having the same frequency as that of the recording fundamental clock and applying the alternating field to the magneto-optical recording medium;
   phase control means for changing a phase of the recording fundamental clock to generate a changed phase clock in response to data to be recorded; and
   light irradiating means for irradiating a spot of a predetermined intensity necessary for thermo-magnetic recording at a particular recording position of the magneto-optical recording medium on the basis of the changed phase clock.

3. A magneto-optical recording apparatus comprising:
   clock generating means for generating a recording fundamental clock synchronized with a reference clock that is recorded in advance on a magneto-optical recording medium;
   magnetic field generating means for generating an alternating field having the same frequency as that of the recording fundamental clock and applying the alternating field to a particular recording position of the magneto-optical recording medium, wherein the magnetic
   field generating means includes a tank circuit formed of a coil provided on a magnetic head and a capacitor connected in parallel to the coil;
   phase control means for changing a phase of the recording fundamental clock in response to data to be recorded; and
   light irradiating means for irradiating a spot of a predetermined intensity necessary for thermomagnetic recording at a particular recording position of the magneto-optical recording medium on the basis of the changed phase clock.

4. The magneto-optical recording apparatus according to claim 2, wherein the light irradiating means irradiates the spot at the particular recording position of the magneto-optical recording medium close in time to a peak value of the alternating field.

5. The magneto-optical recording apparatus according to claim 2, further comprising adjusting means for adjusting a timing at which the alternating field generated from the magnetic field generating means is changed and a timing at which the light irradiating means irradiates the spot.

6. The magneto-optical recording apparatus according to claim 2, wherein the light irradiating means irradiates the particular recording position with a spot of a predetermined intensity necessary for thermo-magnetic recording at every half-period of an alternating field applied to the particular recording position of the magneto-optical recording medium by the magnetic field generating means.

7. A magneto-optical recording apparatus comprising:
   clock generating means for generating a recording fundamental clock synchronized with a reference clock that is recorded in advance on a magneto-optical recording medium, wherein the reference clock is recorded by a clock pit formed of a concave or convex portion formed on a reflection surface of the magneto-optical recording medium, and the clock generating means detects the clock pit on the basis of a change of an amount of a reflected laser light continuously radiated on the magneto-optical recording medium to thereby generate the recording fundamental clock synchronized with the reference clock;
   magnetic field generating means for generating an alternating field having the same frequency as that of the recording fundamental clock and applying the alternating field to a particular recording position of the magneto-optical recording medium;
   phase control means for changing a phase of the recording fundamental clock in response to data to be recorded; and
   light irradiating means for irradiating a spot of a predetermined intensity necessary for thermomagnetic recording at a particular recording position of the magneto-optical recording medium on the basis of the changed phase clock.

8. A magneto-optical recording apparatus comprising:
   clock generating means for generating a recording fundamental clock synchronized with a reference clock that is recorded in advance on a magneto-optical recording medium, wherein the reference clock is recorded by a pregroove formed of a groove wobbled on a reflection surface of the magneto-optical recording medium at a constant period and the clock generating means generates the recording fundamental clock synchronized with the reference clock on the basis of a change of an amount of a reflected laser light continuously radiated on the magneto-optical recording medium;
   magnetic field generating means for generating an alternating field having the same frequency as that of the recording fundamental clock and applying the alternating field to a particular recording position of the magneto-optical recording medium;
   phase control means for changing a phase of the recording fundamental clock in response to data to be recorded; and
   light irradiating means for irradiating a spot of a predetermined intensity necessary for thermomagnetic recording at a particular recording position of the magneto-optical recording medium on the basis of the changed phase clock.

9. A magneto-optical recording apparatus comprising:

clock generating means for generating a recording fundamental clock synchronized with a reference clock that is recorded in advance on a magneto-optical recording medium;

magnetic field generating means for generating an alternating field having the same frequency as that of the recording fundamental clock and applying the alternating field to a particular recording position of the magneto-optical recording medium;

phase control means for changing a phase of the recording fundamental clock in response to data to be recorded; and light irradiating means for irradiating a spot of a predetermined intensity necessary for thermomagnetic recording at a particular recording position of the magneto-optical recording medium on the basis of the changed phase clock, wherein a pit in which an edge position thereof is shifted stepwise from a predetermined reference position in response to data to be recorded is recorded by the light irradiating means on the magneto-optical recording medium by irradiating a spot of a predetermined intensity necessary for thermomagnetic recording on a particular recording position which corresponds to the shifted edge position each time the magnetic field generating means alternately applies a magnetic field of a positive direction or negative direction to the magneto-optical recording medium.

10. The magneto-optical recording apparatus according to claim 9, wherein a pit in which front end and rear end edge positions thereof are shifted stepwise from the predetermined reference position in response to data to be recorded is recorded on the magneto-optical recording medium.

11. The magneto-optical recording apparatus according to claims 9 or 10, wherein the pit is formed by partially inverting a magnetization on a magneto-optical film of the magneto-optical recording medium.

12. The magneto-optical recording apparatus according to claims 9 or 10, wherein an information pit is recorded on the magneto-optical recording medium by stepwise shifting an edge position from a predetermined reference position in response to data to be recorded within a range corresponding to a predetermined shift period smaller than a reproducing signal transition period that is determined in response to a transfer characteristic of an optical detection system which detects a reproducing signal associated with said pit on the basis of a direction of a Kerr rotational angle of a reflected light by irradiating the magneto-optical recording medium with a laser light.

13. A magneto-optical recording and reproducing apparatus for reproducing information from a magneto-optical recording medium in which information is recorded by stepwise shifting an edge position of a pit from a predetermined reference position, comprising:

clock generating means for generating a recording fundamental clock synchronized with a reference clock recorded in advance on the magneto-optical recording medium;

an optical detection system for irradiating the magneto-optical recording medium with a laser light to detect a reproduced signal corresponding to the pit on the basis of a direction of a Kerr rotational angle of a reflected light;

level detecting means for detecting a reproducing level of the reproduced signal at a sample timing synchronized with the recording fundamental clock; and judging means for reproducing a recording information associated with an edge position shift amount of the pit on the basis of the reproducing level.

14. The magneto-optical recording apparatus according to claim 4, further comprising adjusting means for adjusting a timing at which the alternating field generated from the magnetic field generating means is changed and a timing at which the light irradiating means irradiates the spot.

15. The magneto-optical recording apparatus according to claim 4, wherein the light irradiating means irradiates the particular recording position with a spot of a predetermined intensity necessary for thermo-magnetic recording at every half-period of an alternating field applied to the particular recording position of the magneto-optical recording medium by the magnetic field generating means.

16. The magneto-optical recording apparatus according to claim 5, wherein the light irradiating means irradiates the particular recording position with a spot of a predetermined intensity necessary for thermo-magnetic recording at every half-period of an alternating field applied to the particular recording position of the magneto-optical recording medium by the magnetic field generating means.

17. The magneto-optical recording apparatus according to claim 11, wherein an information pit is recorded on the magneto-optical recording medium by stepwise shifting an edge position from a predetermined reference position in response to data to be recorded within a range corresponding to a predetermined shift period smaller than a reproducing signal transition period that is determined in response to a transfer characteristic of an optical detection system for reproducing pits from the magneto-optical recording medium.

18. The magneto-optical recording apparatus according to claim 3, wherein the light irradiating means irradiates the spot at the particular recording position of the magneto-optical recording medium close in time to a peak value of the alternating field.

19. The magneto-optical recording apparatus according to claim 3, further comprising adjusting means for adjusting a timing at which the alternating field generated from the magnetic field generating means is changed and a timing at which the light irradiating means irradiates the spot.

20. The magneto-optical recording apparatus according to claim 3, wherein the light irradiating means irradiates the particular recording position with a spot of a predetermined intensity necessary for thermo-magnetic recording at every half-period of an alternating field applied to the particular recording position of the magneto-optical recording medium by the magnetic field generating means.

21. A magneto-optical recording method comprising the steps of:

generating a recording fundamental clock synchronized with a reference clock that is recorded in advance on a magneto-optical recording medium;

generating an alternating field having the same frequency as that of the recording fundamental clock and applying the alternating field to a particular recording position of the magneto-optical recording medium;

changing a phase of the recording fundamental clock in response to data to be recorded; and irradiating a spot of a predetermined intensity necessary for thermomagnetic recording at a particular recording position of the magneto-optical recording medium on the basis of the changed phase clock, wherein a pit in which an edge position thereof is shifted stepwise from a predetermined reference position in response to data to be recorded is recorded on the magneto-optical recording medium by irradiating a spot of a predetermined intensity necessary for thermo-magnetic recording on a particular recording position which corresponds to the shifted edge position each time a magnetic field of a positive direction or negative direction is alternately applied to the magneto-optical recording medium.

22. The magneto-optical recording method according to claim 21, further comprising the steps of recording on the magneto-optical recording medium a pit in which front end and rear end edge positions thereof are shifted stepwise from the predetermined reference position in response to data to be recorded.

23. The magneto-optical recording method according to claims 21 or 22, wherein the pit is formed by partially inverting a magnetization on a magneto-optical film of the magneto-optical recording medium.

24. The magneto-optical recording method according to claim 22, further comprising the step of recording an information pit on the magneto-optical recording medium by stepwise shifting an edge position from a predetermined reference position in response to data to be recorded within a range corresponding to a predetermined shift period smaller than a reproducing signal transition period that is determined in response to a transfer characteristic of an optical detection system for reproducing pits from the magneto-optical recording medium.

25. The magneto-optical recording method according to claims 21 or 22, further comprising the step of recording an information pit on the magneto-optical recording medium by stepwise shifting an edge position from a predetermined reference position in response to data to be recorded within a range corresponding to a predetermined shift period smaller than a reproducing signal transition period that is determined in response to a transfer characteristic of an optical detection system which detects a reproducing signal associated with said pit on the basis of a direction of a Kerr rotational angle of a reflected light by irradiating the magneto-optical recording medium with a laser light.

26. A magneto-optical recording and reproducing method for reproducing information from a magneto-optical recording medium in which information is recorded by stepwise shifting an edge position of a pit from a predetermined reference position, comprising the steps of:

generating a recording fundamental clock synchronized with a reference clock recorded in advance on the magneto-optical recording medium;

irradiating the magneto-optical recording medium with a laser light to detect a reproduced signal corresponding to the pit on the basis of a direction of a Kerr rotational angle of a reflected light;

detecting a reproducing level of the reproduced signal at a sample timing synchronized with the recording fundamental clock; and reproducing a recording information associated with an edge position shift amount of the pit on the basis of the reproducing level.

27. The magneto-optical recording apparatus according to claim 3, wherein the tank circuit has a resonance frequency which is the same as the recording fundamental clock.

* * * * *